Patented Jan. 25, 1944

2,340,145

UNITED STATES PATENT OFFICE 2,340,145

PROCESS OF PRESERVING FRUIT

Augustus J. Rogers, Beulah, Mich.

No Drawing. Application January 8, 1941,
Serial No. 373,606

3 Claims. (Cl. 99—102)

This invention relates to processes of preserving fruit.

Processes employed heretofore for the preservation of fruit, while preventing molding, fermentation, oxidation and other destructive effects, have radically changed one or more of the characteristics of flavor, color and texture of the fruit. Such results are ordinarily undesirable if they can be avoided.

Accordingly, the principal object of this invention is to provide a process of preserving fruit by means of which the original flavor, color and texture of the fruit are retained in the preserved fruit.

Another object of the invention is to provide a process in which the incorporation of sugar is controlled in a manner to least affect the original color, flavor and texture of the fruit.

A still further object is to provide a method of terminating enzymatic and bacterial action in the preserved fruit without affecting any of the characteristics of color, flavor and texture of the fruit.

Another object of the invention is to minimize oxidation of the fruit during the preserving process.

The invention is particularly directed to the processing of fruit after the initial operations of grading, washing and pitting or coring are performed. Briefly, the invention comprises incorporating sugar into the fruit at a rate which will least affect the natural characteristics of flavor, color and texture of the fruit, and thereafter applying just enough heat to the fruit to destroy the enzymes and bacteria therein. Preferably, although not necessarily, the fruit is subjected to a partial vacuum during the process.

In the following detailed description of the process comprising the invention, reference will be made only to the preservation of cherries, but it will be obvious that the process has a broader application than the preservation of cherries alone. The process is equally applicable to other fruits such as berries, apples, peaches and the like.

The cherries to be preserved are first subjected to the usual preliminary steps of grading, washing, pitting and stemming. These operations may be performed in any of the ordinary ways; and are hereinafter referred to as "preparing the fruit for packing."

In order to sweeten the cherries, and at least partially preserve them, the cherries are placed in a suitable container, usually an enameled can, and sugar is added. The quantity of sugar employed varies with the sweetness desired in the finished product. For some purposes a ratio of 3 pounds of sugar to 5 pounds of fruit, or 60% sugar by weight, has been used. A sweeter cherry is produced by adding sugar in the ratio of 6 pounds of sugar to 4 pounds of fruit, or 150% of sugar by weight.

The sugar not only sweetens the preserved product, but at least partially prevents deterioration after processing. If a large enough percentage of sugar is employed it will completely prevent deterioration of the cherries. However, when the lower ratios of sugar and fruit are used, it may be necessary to add a small quantity of benzoate of soda to give complete protection. The amount is usually $\frac{1}{15}$ of 1% by weight.

Preferably after the container is filled with cherries, and sugar is added, as much air is removed from the container as is possible and the container is hermetically sealed. Removal of air from the container tends to reduce oxidation of the cherries. At the same time it minimizes destructive effects of pressure on the container and its contents during subsequent heating thereof. While desirable to reduce the amount of air in the container, good results are obtained if air is not removed, and the container need not be sealed.

The container is next placed in cold storage, preferably at about 0° F., but in any event, at a temperature low enough to prevent deterioration while the sugar is being incorporated into the cherries. The maximum temperature is approximately 32° F. The cherries are maintained in cold storage for a considerable period, usually about four weeks. Preferably the container is inverted periodically to evenly distribute the sugar throughout the mixture.

During the time the container and its contents are in cold storage, a part of the sugar passes into the cherries, displacing some of the cherry juice, which mixes with and eventually dissolves the sugar remaining around the cherries. The interchange of sugar and fruit juice appears to have taken place by osmosis, which is a relatively slow process. After a sufficient period the sugar and juice become substantially equalized within and without the cherries. In other words, the percentage of sugar within the cellular structure of the cherries is substantially the same as that in the syrup of sugar and cherry juice surrounding the cherries.

It is important that the transfer of sugar and cherry juice takes place very slowly. If the transfer is relatively rapid the cells of the cherries tend to collapse. Also, an undesirable toughness is developed in the cherries when they are heated in the final stage of the process. Since, within reasonable limits, the colder the mixture of cherries and sugar, the slower the transfer takes place, low temperatures are desirable.

It will be apparent that the rapidity of the incorporation of sugar into the fruit, or in other words, the transfer of cherry juice and sugar, can be controlled by controlling the temperature of the mixture of cherries and sugar. Control of the transfer can also be effected by adding sugar in small quantities as the transfer progresses, instead of adding all the sugar at once. The last method may be particularly desirable where temperatures higher than 0° are employed.

In addition to lowering the rapidity of the transfer of sugar, low temperatures prevent deterioration of the fruit during the sugar transfer period.

If the container is opened after the completion of the transfer of sugar and juice mentioned, the cherries will be found to be considerably sweeter than they were originally, but will have retained their original flavor, color and texture. Within a short time after removal from cold storage, however, whether the container is opened or not, the cherries will develop a bitter taste, which will make them extremely unpalatable. This change is due to action of various enzymes and bacteria in the cherries.

To prevent the bitterness, the containers and their contents are heated immediately after removal from cold storage to temperatures between 140° and 185° F. The heat thus applied is sufficient to destroy the enzymes and bacteria and prevent the development of the bitterness referred to.

The heating process apparently has no other effect on the cherries than to prevent enzymatic action causing bitterness. At least there is no noticeable change in the cellular structure of the cherries, nor in their flavor and color. The incorporation of sugar in the previous steps of the process apparently prevents any such changes, for the same heat applied before the sugar is added has the effect of "cooking" the cherries, changing some of their natural characteristics.

Since there is a partial vacuum within the container, the latter may be heated without developing a pressure within the container that will have a destructive effect on the cellular structure of the cherries, nor on the container itself.

Heating of the fruit constitutes the last step of the process. The sealed containers may then be stored at ordinary room temperature for an indefinite period without any further change in their contents. The cherries will keep perfectly for an appreciable time, even if the can is opened.

Cherries preserved by the process of the invention have been kept in open cans for periods of several weeks without any indication of spoiling.

From the foregoing it will be seen that the invention provides a process of preserving fruit by which the natural flavor, color and texture of the fruit are substantially retained.

By the words "normal pressure" used in the claims is meant the complete absence of external pressure, artificially produced, on the contents of the container in which the fruit is placed for processing.

The scope of the invention is indicated in the appended claims.

I claim:

1. The method of treating fruit to preserve the natural color, flavor and texture thereof which comprises preparing the fruit for packing, adding sugar to the fruit in the minimum proportion of three parts of sugar by weight to five parts of fruit, agitating the mixture of fruit and sugar to distribute the sugar throughuot the fruit more or less uniformly, maintaining the fruit at a temperature between 0° and 32° F. and at not to exceed normal pressure for a minimum period of from one to four weeks from and after the addition of the sugar, subsequently removing the mixture from cold storage, promptly thereafter heating the mixture to a temperature of between 140° and 185° F., and finally storing the fruit in a sealed container.

2. The method of treating fruit to preserve the natural color, flavor and texture thereof which comprises preparing the fruit for packing, adding sugar to the fruit in the minimum proportion of three parts of sugar by weight to five parts of fruit, maintaining the mixture of sugar and fruit at a temperature below 32° F. and at not to exceed normal pressure for a period sufficient to permit an equalization of the sugar content within and without the fruit, subsequently removing the mixture from cold storage, promptly thereafter heating the mixture to a temperature of between 140° and 185° F.

3. The method of treating fruit to preserve the natural color, flavor and texture thereof which comprises preparing the fruit for packing, mixing sugar with the prepared fruit, maintaining the fruit at a temperature below 32° F. and at not to exceed normal pressure while causing the fruit to absorb sugar in sufficient quantity to bring the total sugar content thereof up to a minimum of 40%, subsequently removing the mixture from cold storage, promptly thereafter heating the fruit to a temperature sufficient to inactivate any enzymes present in the mixture and not to exceed 185° F.

AUGUSTUS J. ROGERS.